United States Patent
Zhou et al.

(10) Patent No.: US 12,482,292 B2
(45) Date of Patent: Nov. 25, 2025

(54) FINGERPRINT RECOGNITION CIRCUIT, METHOD FOR CONTROLLING FINGERPRINT RECOGNITION CIRCUIT, AND CHIP

(71) Applicant: SILEAD Inc., Shanghai (CN)

(72) Inventors: Jinling Zhou, Shanghai (CN); Jun Yang, Shanghai (CN); Wei Su, Shanghai (CN)

(73) Assignee: SILEAD Inc., Shanghai (CN)

( * ) Notice: Subject to any disclaimer, the term of this patent is extended or adjusted under 35 U.S.C. 154(b) by 69 days.

(21) Appl. No.: 18/619,981

(22) Filed: Mar. 28, 2024

(65) Prior Publication Data
US 2024/0331438 A1   Oct. 3, 2024

(30) Foreign Application Priority Data

Mar. 29, 2023  (CN) .......................... 202310323426.X

(51) Int. Cl.
*G06V 40/13*   (2022.01)
(52) U.S. Cl.
CPC ................. *G06V 40/1306* (2022.01)
(58) Field of Classification Search
CPC ..................... G06V 40/13; G06V 40/1306
See application file for complete search history.

(56) References Cited

U.S. PATENT DOCUMENTS

2019/0012503 A1\*  1/2019  Wu ..................... G06V 40/1306
2023/0326255 A1\* 10/2023  Takahata ............ G06V 40/1347

FOREIGN PATENT DOCUMENTS

WO   WO-2021203418 A1 * 10/2021 ......... G06V 40/1306

OTHER PUBLICATIONS

English translation of WO-2021203418-A1 (Year: 2021).\*

\* cited by examiner

*Primary Examiner* — Lixi C Simpson
(74) *Attorney, Agent, or Firm* — Thomas | Horstemeyer LLP

(57) ABSTRACT

The present disclosure provides a method for controlling a fingerprint identification circuit. The method is used for detecting fingerprint recognition units arranged in an array. A fingerprint recognition unit is connected to a fingerprint recognition circuit. The fingerprint recognition circuit includes a loop selection unit and a signal processing unit. The method includes: resetting the fingerprint recognition circuit to enable the loop selection unit to load a first driving voltage to a sensing electrode; and, controlling a state of the loop selection unit through a sequence signal control to enable the fingerprint recognition units arranged in an array to be in different working states.

20 Claims, 4 Drawing Sheets

FINGERPRINT RECOGNITION CIRCUIT, METHOD FOR CONTROLLING FINGERPRINT RECOGNITION CIRCUIT, AND CHIP

CROSS REFERENCE TO RELATED APPLICATIONS

The present disclosure claims priority to Chinese Patent Application No. 202310323426X entitled "Fingerprint recognition circuit, method for controlling fingerprint recognition circuit, and chip", filed on Mar. 29, 2023, and the entire contents of which are incorporated herein by reference.

TECHNICAL FIELD

The present disclosure relates to the field of fingerprint identification technology, and in particular, to a fingerprint identification circuit, a method for controlling a fingerprint identification circuit, and a chip.

BACKGROUND

Fingerprint recognition systems are widely used in mobile terminals such as mobile phones, computers, tablets, etc. Fingerprint recognition is usually implemented by using principles such as capacitive, optical or ultrasonic methods.

Taking the capacitive fingerprint recognition sensor as an example, when a finger with uneven texture contacts the surface of the fingerprint recognition sensor, finger capacitances of different sizes are formed. The finger capacitance is connected in series to the dielectric layer capacitance. The detection circuit can restore the fingerprint image for fingerprint recognition by converting the capacitance signal, after the finger capacitance is connected in series to the dielectric layer capacitance, into a voltage signal, and performing amplification and other processing on the voltage signal.

It should be noted that the information disclosed in the above background part is only used to enhance understanding of the background of the present disclosure, and therefore may include information that does not constitute related art known to those of ordinary skill in the art.

SUMMARY

According to an aspect of the present disclosure, there is provided a method for controlling a fingerprint recognition circuit, which is used for detecting fingerprint recognition units arranged in an array. A fingerprint recognition unit is connected to a fingerprint recognition circuit. The fingerprint recognition circuit includes a loop selection unit and a signal processing unit; the loop selection unit is used for selectively loading a first driving voltage or a second driving voltage to a sensing electrode of the fingerprint recognition unit, where the first driving voltage is greater than the second driving voltage; the loop selection unit is further used for selectively coupling the sensing electrode to a first input end of the signal processing unit; a second input end of the signal processing unit is connected to a first reference voltage of a fixed level, and an output end of the signal processing unit is used as an output end of the fingerprint identification circuit for processing an electrical signal input to the first input end and outputting a processed detection signal; where the control method includes: resetting the fingerprint identification circuit into a reset state, where the loop selection unit loads the first driving voltage to the sensing electrode in the reset state; and, controlling a state of the loop selection unit through a sequence signal, where the fingerprint recognition units arranged in an array is configured in different working states according to the state of the loop selection unit.

According to another aspect of the present disclosure, there is further provided a fingerprint recognition circuit used for detecting fingerprint recognition units arranged in an array. A fingerprint recognition unit is connected to a fingerprint recognition circuit, where the fingerprint recognition circuit includes a loop selection unit and a signal processing unit; the loop selection unit is used for selectively loading a first driving voltage or a second driving voltage to a sensing electrode of a corresponding fingerprint identification unit, where the first driving voltage is greater than the second driving voltage; and the loop selection unit is further used for selectively coupling the sensing electrode to a first input end of the signal processing unit; a second input end of the signal processing unit is connected to a first reference signal of a fixed level, and an output end of the signal processing unit is used as an output end of the fingerprint identification circuit for processing an electrical signal input to the first input end and outputting a processed detection signal; where the fingerprint identification circuit is configured with a reset state; and in the reset state, the loop selection unit loads the first driving voltage to the sensing electrode; and, the loop selection unit is controlled through a sequence signal, and the fingerprint identification circuit is configured in different working states according to a state of the loop selection unit.

According to another aspect of the present disclosure, there is provided a chip including the fingerprint identification circuit as described above.

It should be understood that the foregoing general description and the following detailed description are exemplary and explanatory only, and do not limit the present disclosure.

BRIEF DESCRIPTION OF THE DRAWINGS

The accompanying drawings here, which are incorporated in and constitute a part of the description, illustrate embodiments consistent with the present disclosure and together with the description serve to explain the principles of the present disclosure. Obviously, the drawings in the following description are some embodiments of the present disclosure, and for those of ordinary skill in the art, other drawings can also be obtained from these drawings without creative efforts.

DETAILED DESCRIPTION

Figure 1:
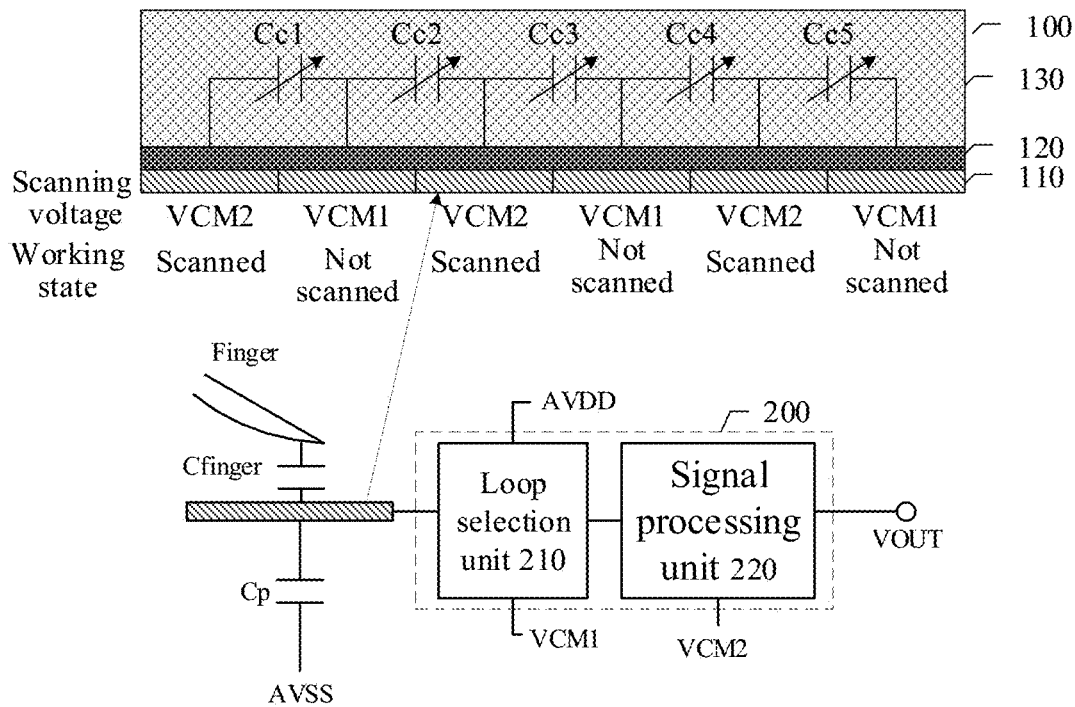
FIG. 1 shows a schematic diagram of a fingerprint identification circuit provided according to an embodiment of the present disclosure.

Preferred embodiments of the present disclosure will be described in more detail below with reference to the accompanying drawings. Although preferred embodiments of the present disclosure are shown in the drawings, it should be understood that the present disclosure may be embodied in various forms and should not be limited to the embodiments set forth here. By contrast, these embodiments are provided so that the present disclosure will be thorough and complete, and will fully convey the scope of the present disclosure to those skilled in the art.

Terms of "first" and "second" in the context is only used for descriptive purposes and cannot be understood as indicating or implying relative importance or implicitly indicating the number of indicated technical features. Therefore, features defined with "first" and "second" may explicitly or implicitly include one or more of the described features. In the description of the present disclosure, "a plurality of" means two or more than two, unless otherwise clearly stated.

In the description of the present disclosure, it should be noted that, unless otherwise clearly stated and defined, the terms "installation", "being connected to" and "connection" should be understood in a broad sense. For example, it can be fixed connection or detachable connection, or integral connection; it can be mechanical connection, electrical connection or mutual communication; it can be direct connection, or indirect connection through an intermediate media; it can be internal communication between two elements or interaction relation between two elements. For those of ordinary skill in the art, the specific meanings of the above terms in the present disclosure can be understood according to specific circumstances.

The following disclosure provides many different embodiments or examples for implementing the various structures of the present disclosure. To simplify the disclosure of the present disclosure, the components and configurations of specific examples are described below. Of course, they are merely examples and are not intended to limit the present disclosure. Furthermore, reference numbers and/or reference letters may be repeated in different examples of the present disclosure. Such repetition is for the purposes of simplicity and clarity, and it does not indicate a relationship between the discussed various embodiments and/or configurations.

The example implementations will be described in detail below with reference to the drawings and embodiments.

FIG. 1 shows a schematic diagram of a fingerprint identification circuit provided according to an embodiment of the present disclosure. As shown in FIG. 1, in an embodiment of the present disclosure, the fingerprint identification circuit 200 is used for detecting the fingerprint identification unit 100, so as to realize the fingerprint recognition function.

The fingerprint recognition unit 100 is arranged in an array, and in some embodiments, the fingerprint recognition unit 100 is a unit of M rows and N columns, that is, the fingerprint recognition unit 100 is an N×M array, where M and N are both positive integers. Each fingerprint recognition unit 100 is in a rectangular, square or other shape, and a plurality of fingerprint recognition units 100 arranged in an array is in a rectangular, circular or other shape.

The fingerprint identification unit 100 is formed on a substrate (not shown in the drawings). The fingerprint identification unit 100 includes a sensing electrode 110, a passivation layer 120 and a dielectric layer 130 sequentially formed on the substrate, where the sensing electrode 110 are arranged in an array. When different areas of a finger come into contact with the fingerprint recognition unit 100, the formed capacitance values are different. For example, when the valley portion and the ridge portion come into contact with the fingerprint recognition unit 100, the capacitance values formed with the sensing electrode 110 in the fingerprint recognition unit 100 are different. The differences in capacitance values between different fingerprint recognition units 100 are detected to distinguish the valley and the ridge, so as to finally realize fingerprint recognition.

In an embodiment, as shown in FIG. 1, when a finger comes into contact with the fingerprint identification unit 100, a fingerprint detection capacitor Cfinger is formed between the finger and the sensing electrode 110, and a parasitic capacitance Cp is formed between the sensing electrode 110 and a first reference voltage AVSS. When a finger touches, the fingerprint recognition circuit 200 detects changes in the electrical signal of the fingerprint detection capacitor Cfinger, and the change in the electrical signal carries fingerprint information.

A fingerprint identification unit 100 is connected to a fingerprint identification circuit 200. The fingerprint identification circuit 200 is used for detecting the fingerprint identification unit 100, thus obtaining the electrical signal corresponding to the capacitance value of each fingerprint identification unit 100, and outputting the above electrical signal, so as to perform fingerprint recognition based on the above electrical signal.

As shown in FIG. 1, the fingerprint identification circuit 200 provided according to the embodiment of the present disclosure includes a loop selection unit 210 and a signal processing unit 220.

The loop selection unit 210 is used for selectively loading the first driving voltage AVDD or the second driving voltage VCM1 to the sensing electrode 110 of the fingerprint recognition unit 100, where the first driving voltage AVDD is greater than the second driving voltage VCM1.

The loop selection unit 210 is further used for selectively coupling the sensing electrode 110 to the first input end of the signal processing unit 220.

An end of the signal processing unit 220 is connected to a first reference signal VCM2 of a fixed level. The output end of the signal processing unit 220 is used as the output end of the fingerprint recognition circuit 200 for processing the electrical signal input at the first input end and outputting a processed detection signal.

In an embodiment, the driving voltage is set with two level signals of high level and low level (the first driving voltage AVDD and the second driving voltage VCM1), and the loop selection unit 210 can selectively load the driving voltage with two level signals of high level and low level to the sensing electrode 110. The first driving voltage AVDD and the second driving voltage VCM1 are internal driving voltages. By using the internal voltage of the chip, it is beneficial to reduce the influence of noise or ripple.

The first reference signal VCM2 to which the second input end of the signal processing unit 220 is connected, is the reference voltage inside the fingerprint recognition circuit 200. By using the internal voltage of the chip, it is beneficial to improving the signal-to-noise ratio of the output voltage and the fingerprint recognition sensitivity.

In some embodiments, the loop selection unit 210 includes three switches, or a single-pole three-throw switch, which may be any element that selectively connects the first driving voltage AVDD, the second driving voltage VCM1, or the first input end of the signal processing unit 220, and is not specifically limited in the present disclosure.

Figure 2:
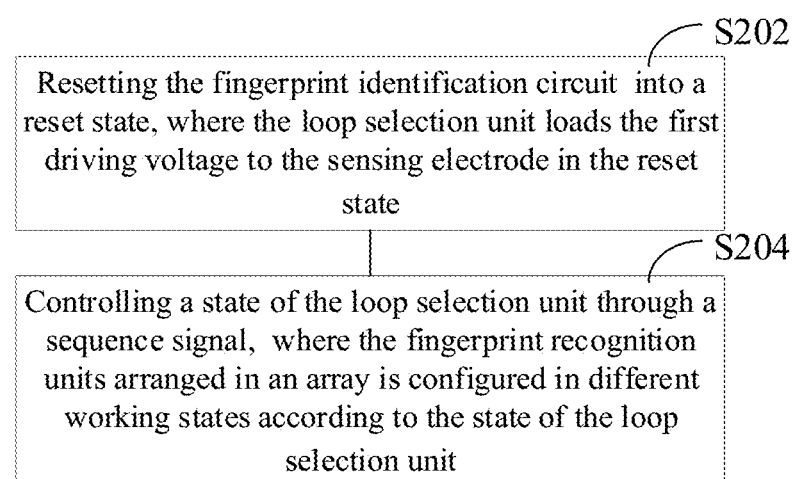
FIG. 2 shows a flow chart of a method for controlling a fingerprint identification circuit provided according to an embodiment of the present disclosure.

FIG. 2 shows a flow chart of a method for controlling a fingerprint identification circuit provided according to an embodiment of the present disclosure. In an embodiment, as shown in FIG. 2, the method for controlling a fingerprint identification circuit provided according to an embodiment of the present disclosure includes the following.

In S202, the fingerprint identification circuit is reset to enable the loop selection unit to load the first driving voltage to the sensing electrode.

Before fingerprint recognition is performed, in each fingerprint recognition unit 100, the first driving voltage AVDD is used for charging the fingerprint recognition capacitor Cfinger and the parasitic capacitor Cp, and the fingerprint recognition capacitor Cfinger and the parasitic capacitor Cp store charges, so as to transfer the charges stored in the fingerprint recognition capacitor Cfinger to the signal processing unit 220 during the detection stage.

In S204, the state of the loop selection unit is controlled through a sequence signal to enable the fingerprint recognition units arranged in an array to be in different working states.

The sequence signal in S204 can be determined according to the actual situation to control the state of the loop selection unit 210.

In an embodiment, the fingerprint identification circuit 200 is configured with two working states, including a first working state and a second working state. In the first working state, the loop selection unit 210 alternately connects the first driving voltage AVDD and the first input end of the processing unit 220 to the sensing electrode 110, so that the signal processing unit 220 outputs a detection signal. In the second working state, the loop selection unit 210 alternately loads the first driving voltage AVDD and the second driving voltage VCM1 to the sensing electrode 110.

The state corresponding to that the first driving voltage AVDD and the first input end of the signal processing unit 220 are alternately coupled to the sensing electrode 110 through the sequence signal, is the first working state, which is called the fingerprint recognition unit 100 being in the first working state. The state corresponding to that the first driving voltage AVDD and the second driving voltage VCM1 are alternately loaded to the sensing electrode 110 through the sequence signal, is the second working state, which is also called the fingerprint recognition unit 100 being in the second working state.

It should be noted that the sequence signal can be a flag used for determining which operations are performed during a cycle. The sequence signal is a signal with time on the horizontal axis, that is, a signal in the time domain for observing the characteristics of the signal in the time domain. The sequence signal generally adopts a two-level system of beat potential and beat pulse; that is, a beat potential includes several beat pulses, i.e., clock cycles. The beat potential marks the time of a scanning cycle, and the beat pulse divides a scanning cycle into a plurality of smaller time intervals. According to needs, the time intervals is equal or unequal, and the sequence signal is a square wave signal, which is not specifically limited in the present disclosure.

When a finger touches the fingerprint identification unit 100, the capacitance value of the fingerprint detection capacitor Cfinger changes. The fingerprint identification unit 100 in the first working state can detect the above change through the signal processing unit 220 to realize fingerprint identification.

In the actual implementation process, for the fingerprint identification unit 100 in the first working state, when the fingerprint identification circuit 200 is reset, the loop selection unit 210 loads the first driving voltage AVDD to the sensing electrode 110 to charge the parasitic capacitance Cp and the fingerprint detection capacitor Cfinger, so as to achieve reset; when charging of the parasitic capacitance Cp and the fingerprint detection capacitor Cfinger is finished, the detection stage is entered, and the loop selection unit 210 couples the sensing electrode 110 to the first input end of the signal processing unit 220, so as to transfer the charges accumulated in the parasitic capacitance Cp and the fingerprint detection capacitor Cfinger to the signal processing unit 220. The signal processing unit 220 processes the transferred charges to output a processed detection signal, so as to perform fingerprint recognition according to the detection signal.

In the actual implementation process, for the fingerprint recognition unit 100 in the second working state, the loop selection unit 210 loads the first driving voltage AVDD to the sensing electrode 110 to charge the parasitic capacitance Cp and the fingerprint detection capacitance Cfinger. When charging of the parasitic capacitance Cp and the fingerprint detection capacitance Cfinger is finished, the loop selection unit 210 loads the second driving voltage VCM1 to the sensing electrode 110.

In the embodiments of the present disclosure, the method for controlling the fingerprint recognition circuit is used for detecting fingerprint recognition units arranged in an array. A fingerprint recognition unit is connected to a fingerprint recognition circuit. The fingerprint recognition circuit includes a loop selection unit and a signal processing unit. The loop selection unit is used for selectively loading the first driving voltage or the second driving voltage to the sensing electrode of the fingerprint recognition unit, and is further used for selectively coupling the sensing electrode to the first input end of the signal processing unit. The second input end of the signal processing unit is connected to a second reference signal of a fixed level, and the output end is used as the output end of the fingerprint recognition circuit. The signal processing unit is used for processing the electrical signal input at the first input end and output the processed detection signal to perform fingerprint recognition according to the processed detection signal. The control method includes resetting the fingerprint recognition circuit to enable the loop selection unit to load the first driving voltage to the sensing electrode, and controlling the state of the loop selection unit through the sequence signal to enable the fingerprint recognition units arranged in an array to be in different working states. The circuit structure is simple, and the accuracy of fingerprint recognition can be improved by resetting the fingerprint recognition circuit.

Figure 3:
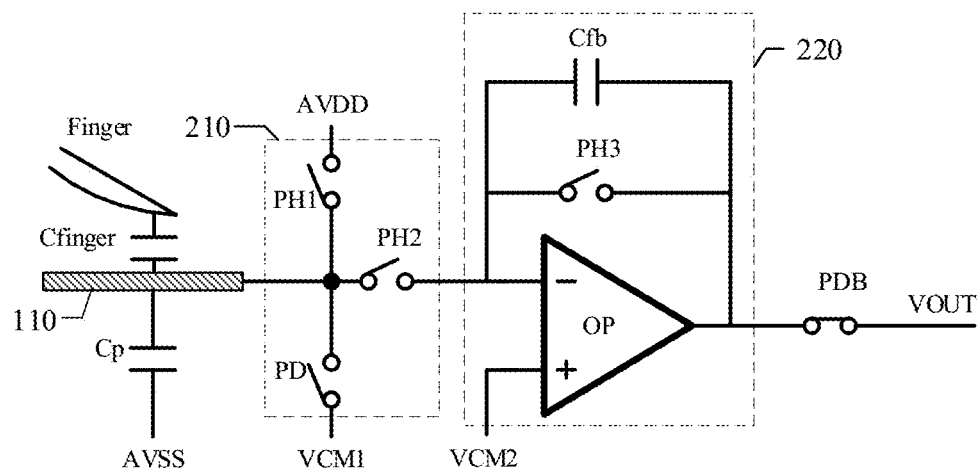
FIG. 3 shows a circuit diagram when the fingerprint identification circuit provided according to an embodiment of the present disclosure is in a first working state.

FIG. 3 shows a circuit diagram of a fingerprint identification circuit in a first working state provided according to an embodiment of the present disclosure. As shown in FIG. 3, the fingerprint identification circuit 200 provided according to the embodiment of the present disclosure includes a loop selection unit 210, where the loop selection unit 210 includes a first switch PH2, a second switch PH1, and a third switch PD.

The first switch PH2 is used for coupling the sensing electrode 110 to the first input end of the signal processing unit 220.

The second switch PH1 is used for loading the first driving voltage AVDD to the sensing electrode 110.

The third switch PD is used for loading the second driving voltage VCM1 to the sensing electrode 110.

In the embodiment, the fingerprint recognition circuit 200 controls the off and on states of the first switch PH2, the second switch PH1 and the third switch PD through the sequence signal, and provides different working states according to combinations of the off and on states of the above switches. That is to say, working status corresponds to the corresponding sequence signals.

In an embodiment, as shown in FIG. 3, the above S202 of resetting the fingerprint recognition circuit includes: controlling the second switch PH1 of each fingerprint recognition circuit 200 to be on, and controlling the first switch PH2 of each fingerprint recognition circuit 200 and the third switch PD of each fingerprint recognition circuit 200 to be off.

As shown in FIGS. 3 to 6, the above S204 of controlling the state of the loop selection unit through a sequence signal to enable the fingerprint recognition units arranged in an array to be in different working states, includes:

in the first working state, setting the third switch PD to normally off, the second switch PH1 to firstly off and then on, and the first switch PH2 to firstly on and then off; and in the second working state, setting the first switch PH1 to normally off, the third switch PD to firstly on and then off, and the second switch PH1 to firstly off and then on.

Figure 5:
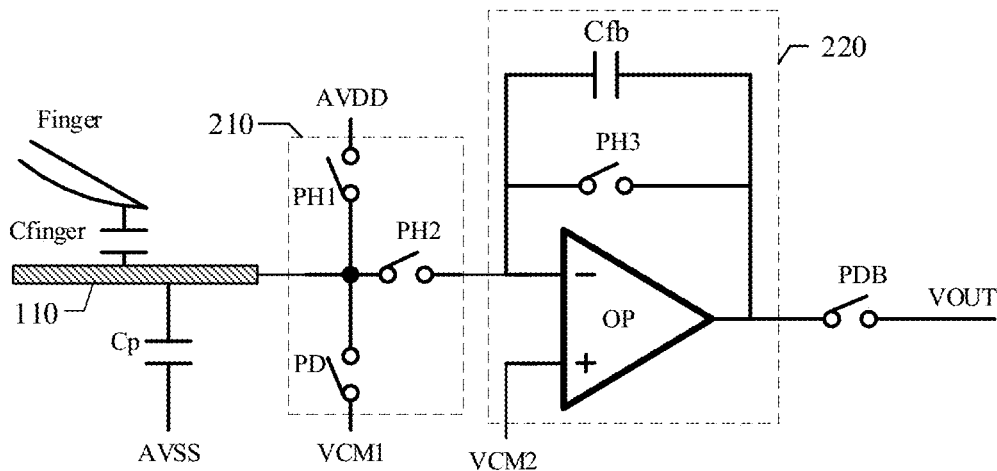
FIG. 5 shows a circuit diagram when the fingerprint identification circuit provided according to an embodiment of the present disclosure is in a second working state.

Continuing to refer to FIGS. 3 and 5, the fingerprint recognition circuit 200 further includes a signal processing unit 220, where the signal processing unit 220 includes an amplifier OP, a fourth switch PH3, a feedback element, and a fifth switch PDB.

The positive input end of amplifier OP is connected to the first reference voltage VCM2, and the negative input end of amplifier OP is coupled to the sensing electrode 110 through the first switch PH2.

An end of the fourth switch PH3 is coupled to the negative input end of the amplifier OP, and another end is connected to the output end of the amplifier OP.

An end of the feedback element is connected to the negative input end of the amplifier OP, and another end is connected to the output end of the amplifier OP.

An end of the fifth switch PDB is connected to the output end of the amplifier OP, and another end is used as the output end VOUT of the fingerprint identification circuit 200.

In an embodiment, the sequence signal of the fourth switch PH3 is the same as the sequence signal of the second switch PH1. The feedback element is reset by turning on the fourth switch PH3, and at the same time, the fifth switch PDB is set to normally on. That is, when the second switch PH1 is controlled to be on, and the first switch PH2 and the third switch PD are turned off, the second switch PH1 is turned on to enable the first driving voltage AVDD to be loaded to the sensing electrode 110. At this time, since the sequence signal of the fourth switch PH3 is the same as the sequence signal of the second switch PH1, the fourth switch PH3 is turned on and the voltage at both ends of the feedback element is cleared to zero, so as to realize reset of the feedback element.

In some embodiments, the feedback element is a feedback capacitor Cfb in FIG. 3, or other elements such as a resistor or an inductor, which is not specifically limited in the present disclosure. In the subsequent description, the feedback element is explained by taking the feedback capacitor Cfb as an example.

In an embodiment, as shown in FIGS. 3 to 6, in the first working state, the fifth switch PDB is set to normally on, and in the second working state, the fifth switch PDB is set to normally off.

Figure 4:
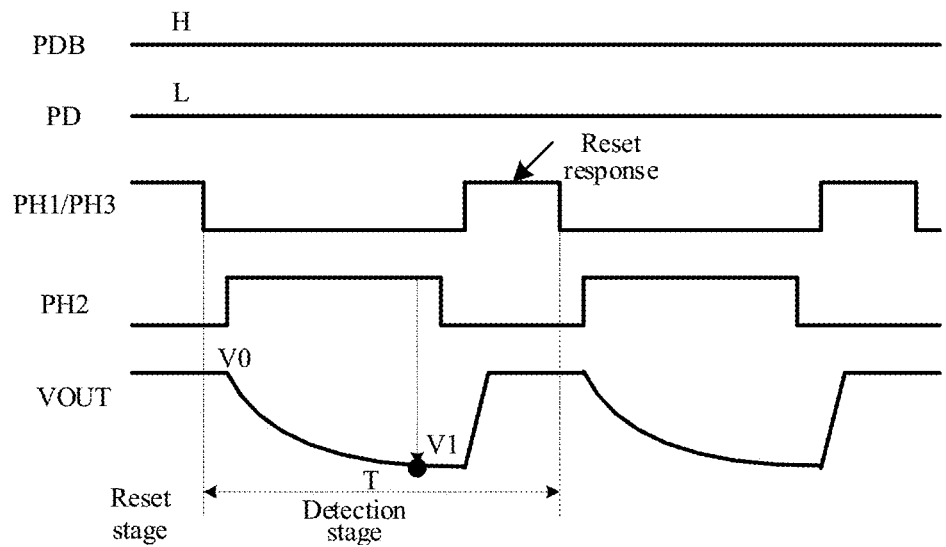
FIG. 4 shows a sequence diagram when the fingerprint recognition circuit in FIG. 3 is in the first working state.

FIG. 3 shows a circuit diagram when the fingerprint identification circuit provided according to an embodiment of the present disclosure is in a first working state, and FIG. 4 shows a sequence diagram when the fingerprint identification circuit in FIG. 3 is in the first working state.

In the embodiment, for the fingerprint recognition circuit in the first working state, its sequence signal can be divided into two stages, namely a reset stage and a detection stage.

As shown in FIG. 4, in the embodiment, for the fingerprint detection circuit 200 in the first working state, during the reset stage, the second switch PH1, the fourth switch PH3 and the fifth switch PDB are controlled to be on, and the first switch PH2 and the third switch PD are controlled to be off. Referring to FIG. 3, for the fingerprint detection circuit 200 in the first working state, during the reset stage, the first driving voltage AVDD is electrically connected to the sensing electrode 110, an end of the parasitic capacitance Cp is coupled to the sensing electrode 110, and another end of the parasitic capacitance Cp is connected to the second reference voltage AVSS of the fingerprint detection circuit 200. The second reference voltage AVSS is an internal reference voltage. The second reference voltage AVSS is smaller than the first reference voltage VCM2, and there is no need to consider whether the second reference voltage AVSS is positive or negative. For example, the second reference voltage AVSS is zero potential, and the first reference voltage VCM2 is a voltage provided by a voltage source of a fixed level.

Continuing to refer to FIG. 4, when the fingerprint detection circuit 200 is in the first working state, a sequence cycle corresponds to a detection stage. During a detection stage, the fifth switch PDB is set to normally on, and the third switch PD is set to normally off. A sequence cycle T includes a transmission segment and a sampling segment. Under control of the sequence signal in the transmission segment, the second switch PH1 and the fourth switch PH3 are off, the first switch PH2 is on, the sensing electrode 110 is coupled to the negative input end of the amplifier OP, and the positive input end of the amplifier OP is connected to the first reference voltage VCM2 of a fixed level. The charges accumulated in the fingerprint detection capacitor Cfinger and the parasitic capacitance Cp are transferred to the amplifier OP, the voltage difference between two ends of the feedback capacitor Cfb changes, and the voltage at the output end of the amplifier OP gradually decreases from the initial voltage V0 to V1. The change in the voltage at the output end carries the information about the fingerprint detection capacitor Cfinger.

When the fingerprint detection circuit 200 in the first working state is under control of the sequence signal in the sampling segment, the second switch PH1 and the fourth switch PH3 are turned on, the first switch PH2 is turned off, and the amplifier OP is disconnected from the sensing electrode 110, the first driving voltage AVDD is loaded to the sensing electrode 110 to charge the fingerprint detection capacitor Cfinger and the parasitic capacitance Cp, the voltage of the feedback capacitor Cfb is cleared to zero, and the output voltage of the amplifier OP returns to the initial voltage V0 to reset the fingerprint recognition circuit.

Figure 6:
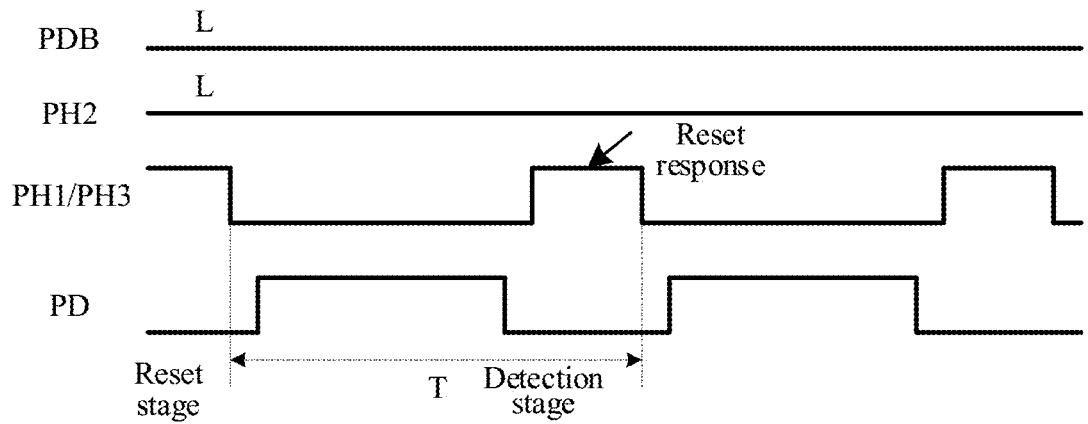
FIG. 6 shows a sequence diagram when the fingerprint recognition circuit in FIG. 5 is in the second working state.

FIG. 5 shows a circuit diagram when the fingerprint identification circuit provided according to an embodiment of the present disclosure is in a second working state, and FIG. 6 shows a sequence diagram when the fingerprint identification circuit in FIG. 5 is in the second working state.

In the embodiment, for the fingerprint recognition circuit in the second working state, its sequence signal can be divided into two stages, namely a reset stage and a detection stage.

As shown in FIG. 6, in the embodiment, for the fingerprint detection circuit 200 in the second working state, during the reset stage, the first switch PH2, the third switch PD, the fourth switch PH3 and the fifth switch PDB are controlled to be off, and the second switch PH1 is controlled to be on. Referring to FIG. 5, for the fingerprint detection circuit 200 in the second working state, during the reset stage, the first driving voltage AVDD is electrically connected to the sensing electrode 110, an end of the parasitic capacitance Cp is coupled to the sensing electrode 110, another end of the parasitic capacitance Cp is connected to the second reference voltage AVSS of the fingerprint detection circuit 200, the fingerprint detection capacitor Cfinger is coupled to the sensing electrode 110, and the first driving voltage AVDD charges the parasitic capacitance Cp and the fingerprint detection capacitor Cfinger. Among them, the second reference voltage AVSS is an internal reference voltage. For example, the second reference voltage AVSS is zero potential.

Continuing to refer to FIG. 6, when the fingerprint detection circuit 200 is in the second working state, a sequence cycle corresponds to a detection stage. During a detection stage, the fifth switch PDB and the first switch PH2 are set to normally off, the second switch PH1 is firstly turned off and then turned on, the third switch PD is firstly turned on and then turned off, and the fingerprint detection circuit 200 in the second working state has no output, thus ensuring that the fingerprint detection units 100 in different working states have similar attenuation laws, and improving accuracy of fingerprint detection.

In the specific implementations, the first driving voltage AVDD is set to the first power supply voltage, and the second driving voltage VCM1 is set to the second power supply voltage. Due to the influence of the amplifier structure, the second power supply voltage is smaller than the first power supply voltage. The voltage value of the first reference voltage VCM2 can be determined according to the actual situations, and the second reference voltage AVSS is set to ground.

For the adjacent fingerprint detection units in the first working state and the second working state, such as the third fingerprint detection unit in the first working state, as well as the second fingerprint detection unit and the fourth fingerprint detection unit in the second working state in FIG. 1, according to the law of conservation of charge, the following can be obtained:

$$A_{VDD}(C_p + C_{finger}) = V_{CM2}(C_p + C_{finger}) + \quad \text{(Formula 1)}$$
$$(V_{CM2} - V_1)C_{fb} + (V_{CM2} - V_{CM1})(C_{C2} + C_{C3}).$$

According to formula 1, the output voltage $V_1$ of the signal processing circuit can be obtained as follows:

$$V_1 = V_{CM2} - \frac{(A_{VDD} - V_{CM2})(C_p + C_{finger}) - (V_{CM2} - V_{CM1})(C_{C2} + C_{C3})}{C_{fb}}, \quad \text{(Formula 2)}$$

where is $A_{VDD}$ the voltage value of the first driving voltage, $V_{CM2}$ is the voltage value of the first reference voltage, $C_p$ is the capacitance value of the parasitic capacitance, $C_{finger}$ is the capacitance value of the fingerprint detection capacitor, $V_{CM1}$ is the voltage value of the second driving voltage, $C_{C2}$ and $C_{C3}$ are parasitic capacitances of adjacent fingerprint detection units respectively.

The output voltage of $V_1$ of the signal processing unit 220 is transmitted to the analog-to-digital conversion (ADC) unit for processing. The capacitance values $C_{finger}$ of the fingerprint detection capacitors in different fingerprint detection units 100 can be determined according to the output of the ADC.

When the fingerprint recognition circuit 200 is working, the entire fingerprint recognition unit array is usually not scanned at the same time, but scanned row by row or column by column, or scanned by using other scanning methods. However, when the entire array is not scanned at the same time, there will be differences between the states of the fingerprint recognition unit that are scanned (the fingerprint recognition units in the first working state) and the states of the fingerprint recognition units that are not scanned (the fingerprint recognition units in the second working state) in the array.

Formula 2 is further transformed to obtain the following:

$$V_1 = V_{CM2} - \frac{(A_{VDD} - V_{CM2})(C_p + C_{finger}) - \Delta V(C_{C2} + C_{C3})}{C_{fb}}. \quad \text{(Formula 3)}$$

It can be seen from formula 3 that, due to the presence of $\Delta V = V_{CM2} - V_{CM1}$, there is an extra error term $$-\frac{(C_{C2} + C_{C3})}{C_{fb}} \Delta V$$

in the output voltage of the signal processing unit.

In an embodiment, the difference between the voltage value of the second driving voltage VCM1 and the voltage value of the first reference voltage VCM2 is within a preset range, so as to reduce the impact of the parasitic capacitance between adjacent fingerprint recognition units on the recognition results, thus improving detection accuracy.

It should be noted that the preset range can be determined according to the actual situations or circuit design capabilities, so as to minimize the impact of $\Delta V$. For example, the preset range can be −0.5V~0.5V.

Figure 7:
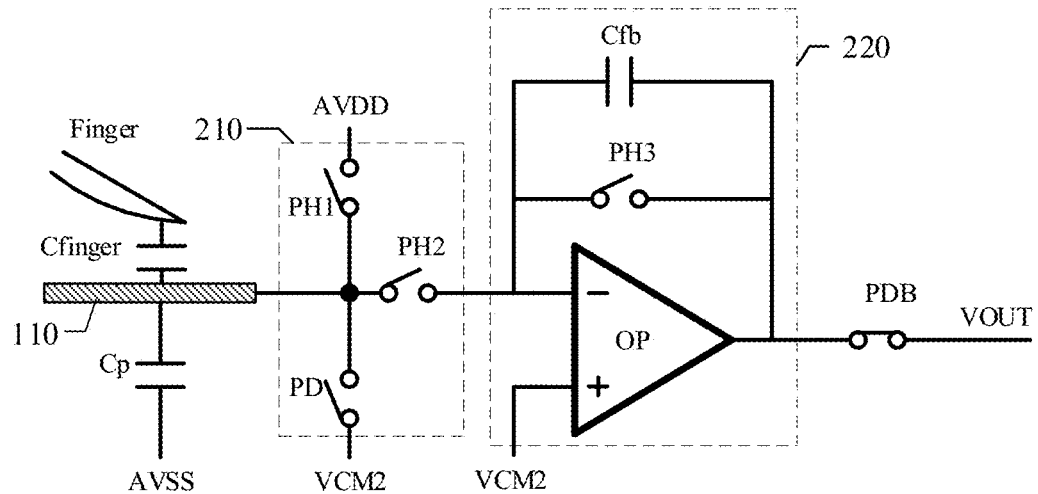
FIG. 7 shows a circuit diagram of another fingerprint recognition circuit provided according to an embodiment of the present disclosure.

FIG. 7 shows a circuit diagram of another fingerprint identification circuit provided according to an embodiment of the present disclosure. As shown in FIG. 7, the voltage value of the second driving voltage VCM1 is equal to the voltage value of the first reference voltage VCM2.

During the implementation process, the second driving voltage VCM1 is equal to the first reference voltage VCM2. That is, the fingerprint identification unit in the first working state and the fingerprint identification unit in the second working state are both connected to the first reference voltage VCM2, the fingerprint recognition unit in the scanning state is equivalently connected to the first reference voltage VCM2 through the amplifier OP, and the fingerprint recognition unit that has not been scanned is directly connected to the second driving voltage VCM1 through the third switch PD, so that the voltage values of the second driving voltage VCM1 and the first reference voltage VCM2 are equal, therefore, the ΔV in formula 3 is constantly equal to 0.

For the sequence diagrams of the fingerprint identification circuit, provided according to the embodiment, when it is in the first working state and the second working state, reference can be made to FIGS. 4 and 6, which will not be described again here.

In the embodiment of the present disclosure, by controlling the difference between the second driving voltage and the first reference voltage within a preset range, or controlling the two of them to be equal, the impact of the error term on the output voltage is eliminated. Even there is impact of factors such as high temperature, high humidity, static pressure and chip dropping on the parasitic capacitances Cc among the various fingerprint detection units in the array, the output voltage no longer fluctuates, thus improving the accuracy of fingerprint recognition.

Figure 8:
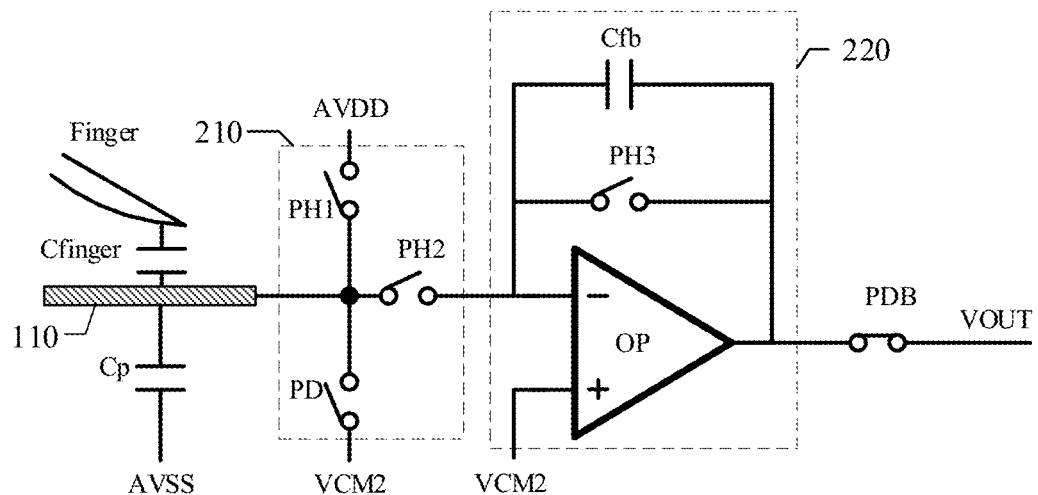
FIG. 8 shows a circuit diagram of yet another fingerprint identification circuit provided according to an embodiment of the present disclosure.

FIG. 8 shows a circuit diagram of yet another fingerprint identification circuit provided according to an embodiment of the present disclosure. Based on the embodiment of FIG. 7, the sequence signal of the fourth switch PH3 is adjusted to reset the signal processing unit 220 through the fourth switch PH3 controlled by the sequence signal. That is, in this embodiment, the circuit structures of the loop selection unit 210 and the signal processing unit 220 are the same as those in the previous embodiments, which will not be described again here.

In an embodiment, with regard to the states of the first switch PH2, the second switch PH1, and the third switch PD in the loop selection unit 210, in the first working state, the third switch PD is set to normally off, the second switch PH1 is firstly turned on and then turned off, the first switch PH2 is firstly turned off and then turned on; in the second working state, the first switch PH2 is set to normally off, the third switch PD is firstly turned off and then turned on, and the second switch PH1 is firstly turned on and then turned off.

For the fourth switch PH3 and the fifth switch PDB in the signal processing unit 220, the scanning cycle of the sequence signal of the fourth switch PH3 (such as T_scan in FIG. 9) is N times of the scanning cycle of the sequence signal of the second switch PH1 (such as Tin FIG. 9), where N is a positive integer greater than or equal to 2. In the first scanning cycle corresponding to the sequence signal of the second switch PH1, the second switch PH1 and the fourth switch PH3 are firstly turned on and then turned off to reset the fingerprint recognition circuit 200 through the second switch PH1, so that the loop selection unit 210 loads the first driving voltage AVDD to the sensing electrode 110 and resets the signal processing unit 220 through the fourth switch PH3. That is, the first scanning cycle of the second switch PH1 can also be defined as the reset stage of the fingerprint identification circuit 200. In the first working state, the fifth switch PDB is set to normally on; in the remaining N−1 scanning cycles corresponding to the sequence signal of the second switch PH1, the fourth switch PH3 is set to normally off; that is, the N−1th scanning cycle of the second switch PH1 can also be called as the detection stage of the fingerprint identification circuit 200. Among them, in the Nth scanning cycle, the signal processing unit 220 outputs the detection signal, or, in the remaining N−1 scanning cycles, the signal processing unit 220 outputs the detection signals respectively and performs fingerprint recognition according to the average value of the detection signals output in the N−1 scanning cycles. In the second working state, the fourth switch PH3 and the fifth switch PDB are set to normally off.

In order to deepen the understanding of the embodiments of the present disclosure, the following description takes that the scanning cycle of the sequence signal of the fourth switch PH3 is twice of the scanning cycle of the sequence signal of the second switch PH1 as an example.

Figure 9:
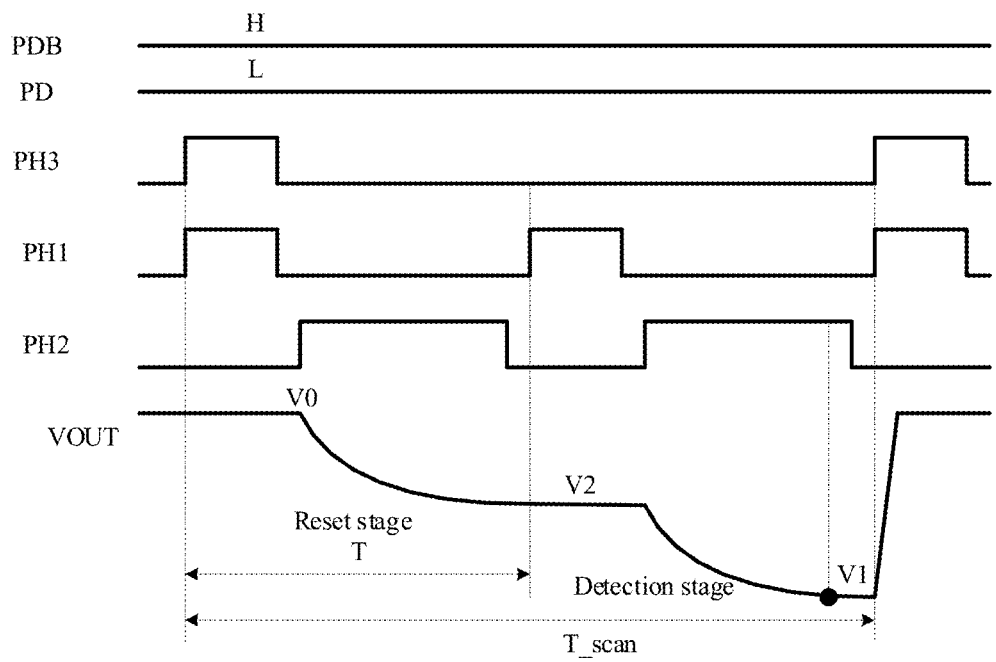
FIG. 9 shows a sequence diagram when the fingerprint recognition circuit in FIG. 8 is in the first working state.

FIG. 9 shows a sequence diagram when the fingerprint recognition circuit in FIG. 8 is in the first working state.

In the embodiment, for the fingerprint identification circuit 200 in the first working state, its sequence signal can be divided into two stages, namely the reset stage and the detection stage.

As shown in FIG. 9, in the embodiment, for the fingerprint detection circuit 200 in the first working state, during the reset stage, the second switch PH1 and the fourth switch PH3 are controlled to be firstly on and then off, the first switch PH2 is firstly turned off and then turned on, the fifth switch PDB is set to normally on, and the third switch PD is set to normally off. Referring to FIG. 8, for the fingerprint detection circuit 200 in the first working state, during the reset stage, the second switch PH1 is on, the first driving voltage AVDD is loaded to the sensing electrode 110 to charge the fingerprint detection capacitor Cfinger and the parasitic capacitance Cp, the fourth switch PH3 is on, the voltage of the feedback capacitor Cfb is cleared to zero, and the positive input end of the amplifier OP is connected to the first reference voltage VCM2 of a fixed level. When the second switch PH1 and the fourth switch PH3 are off, and the first switch PH2 is on, the sensing electrode 110 is connected to the negative input end of the amplifier OP, the charges accumulated in the fingerprint detection capacitor Cfinger and the parasitic capacitance Cp are transferred to the amplifier OP, the voltage difference between two ends of the feedback capacitor Cfb changes, the positive input end of the amplifier OP is connected to the first reference voltage VCM2 of a fixed level, and the output end voltage of the amplifier OP gradually decreases from the initial voltage V0 to the first voltage V2.

For the fingerprint detection circuit 200 in the first working state, during the detection stage, the fifth switch PDB is set to normally on, the third switch PD and the fourth switch PH3 are set to normally off, the second switch PH1 is controlled to be firstly on and then off, and the first switch PH2 is firstly turned off and then turned on. Continuing to refer to FIG. 8, when the second switch PH1 is turned on and the first switch PH2 is turned off, the first driving voltage AVDD is loaded to the sensing electrode 110 to charge the fingerprint detection capacitor Cfinger and the parasitic capacitance Cp. When the second switch PH1 is off and the first switch PH2 is on, the sensing electrode 110 is coupled to the negative input end of the amplifier OP, the charges accumulated in the fingerprint detection capacitor Cfinger and the parasitic capacitance Cp are transferred to the amplifier OP, and the voltage difference between two ends of the feedback capacitor Cfb changes. The positive input end of the amplifier OP is connected to the first reference voltage VCM2 of a fixed level, and the output end voltage of the amplifier OP gradually decreases from the first voltage V2 to the second voltage V1. The change in the voltage at the output end carries information about the fingerprint detection capacitor Cfinger.

Figure 10:
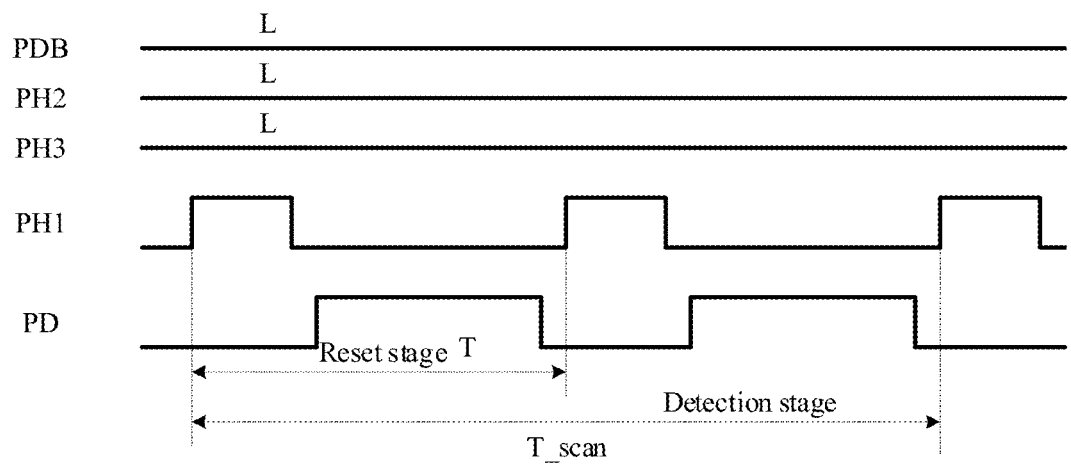
FIG. 10 shows a sequence diagram when the fingerprint recognition circuit in FIG. 8 is in the second working state.

FIG. 10 shows a sequence diagram when the fingerprint recognition circuit in FIG. 8 is in the second working state.

In the embodiment, for the fingerprint recognition circuit in the second working state, its sequence signal can be divided into two stages, namely a reset stage and a detection stage.

As shown in FIG. 10, in the embodiment, the first switch PH2, the fourth switch PH3 and the fifth switch PDB in the fingerprint detection circuit 200 in the second working state are configured to be normally off. During the reset stage, the second switch PH1 is firstly turned on and then turned off, and the third switch PD is firstly turned off and then turned on. Referring to FIG. 8, during the reset stage, when the second switch PH1 is on and the third switch PD is off, the first driving voltage AVDD is loaded to the sensing electrode 110 to charge the fingerprint detection capacitance Cfinger and the parasitic capacitance Cp. When the second switch PH1 is off and the third switch PD is on, the second driving voltage VCM1 is loaded to the sensing electrode 110, and the fingerprint detection circuit in the second working state has no output, thus ensuring that the fingerprint detection units in different working states have similar attenuation laws, and improving accuracy of fingerprint detection.

It should be noted that, for the fingerprint detection circuit in the second working state, the sequence signals in the detection stage and the reset stage are the same, which will not be described again here.

In the specific implementations, the first driving voltage AVDD is set to the first power supply voltage. The second driving voltage VCM1 and the first reference voltage VCM2 are set to the second power supply voltage. However, due to the impact of the amplifier structure, the second power supply voltage is smaller than the first power supply voltage. The second reference voltage AVSS is set to ground.

Those skilled in the art will understand that various aspects of the present disclosure may be implemented as systems, methods or program products. Therefore, various aspects of the present disclosure can be implemented in the following forms, namely: complete hardware implementations, complete software implementations (including firmware, microcode, etc.), or implementations combining hardware aspects and software aspects, which may be collectively referred to here as "circuit", "module" or "system".

According to embodiments of the present disclosure, there is further provided a fingerprint recognition circuit for detecting fingerprint recognition units arranged in an array. A fingerprint recognition unit is connected to a fingerprint recognition circuit. Among them, the fingerprint recognition circuit includes a loop selection unit and a signal processing unit. The loop selection unit is used for selectively loading the first driving voltage or the second driving voltage to the sensing electrode of the corresponding fingerprint recognition unit, where the first driving voltage is greater than the second driving voltage. The loop selection unit is further used for selectively coupling the sensing electrode to the first input end of the signal processing unit. The second input end of the signal processing unit is connected to the first reference signal of a fixed level, and the output end of the signal processing unit is used as the output end of the fingerprint recognition circuit for processing the electrical signal input at the first input end and outputting the processed detection signal. Among them, the fingerprint identification circuit configuration has a reset state. In the reset state, the loop selection unit loads the first driving voltage to the sensing electrode. The loop selection unit is controlled through the sequence signal to enable the fingerprint recognition circuit to be in different working states.

In an embodiment, for adjacent fingerprint recognition units in different working states, the difference between the voltage value of the second driving voltage and the voltage value of the first reference voltage is within a preset range.

In an embodiment, the voltage value of the second driving voltage is equal to the voltage value of the first reference voltage.

It should be noted that the first driving voltage and the second driving voltage are internal driving voltages, and the first reference voltage is an internal reference voltage.

In an embodiment, the fingerprint identification circuit is configured with two working states, including a first working state and a second working state. In the first working state, the loop selection unit alternately connects the first driving voltage and the first input end of the signal processing unit to the sensing electrode, so as to enable the signal processing unit to output the detection signal. In the second working state, the loop selection unit alternately loads the first driving voltage and the second driving voltage to the sensing electrode.

In an embodiment, the loop selection unit includes: a first switch used for coupling the sensing electrode to the first input end of the signal processing unit; a second switch used for loading the first driving voltage to the sensing electrode; and, a third Switch, used for loading the second driving voltage to the sensing electrode; where, in the reset state, the second switch of each fingerprint recognition circuit is turned on, and the first switch and the third switch are turned off; in the first working state, the third switch is set to normally off, the second switch is firstly turned off and then turned on, the first switch is firstly turned on and then turned off; in the second working state, the first switch is set to normally off, the third switch is firstly turned on and then turned off, and the second switch is firstly turned off and then turned on.

In an embodiment, the signal processing unit includes: an amplifier, the positive input end of the amplifier being connected to the first reference voltage, and the negative input end of the amplifier being coupled to the sensing electrode through the first switch; a fourth switch, an end of the fourth switch being coupled to the negative input end the amplifier, another end of the fourth switch being connected to the output end of the amplifier; a feedback element, an end of the feedback element being connected to the negative input end of the amplifier, and another end of the feedback element being connected to the output end of the amplifier; and, a fifth switch, an end of the fifth switch being connected to the output end of the amplifier connection, and another end of the fifth switch being used as the output end of the fingerprint recognition circuit; where, the sequence signal of the fourth switch is the same as the sequence signal of the second switch; in the first working state, the fifth switch is set to normally on; in the second working state, the fifth switch is set to normally off.

In an embodiment, the loop selection unit includes: a first switch, used for coupling the sensing electrode to the first input end of the signal processing unit; a second switch, used for loading the first driving voltage to the sensing electrode; a third switch, used for loading the second driving voltage to the sensing electrode; where, in the first working state, the third switch is set to normally off, the second switch is firstly turned on and then turned off, and the first switch is firstly turned off and then turned on; in the second working state, the first switch is set to normally off, the third switch is firstly turned off and then turned on, and the second switch is firstly turned on and then turned off.

In an embodiment, the signal processing unit includes: an amplifier, the positive input end of the amplifier being connected to the first reference voltage, and the negative input end of the amplifier being coupled to the sensing electrode through the first switch; a fourth switch, an end of the fourth switch being coupled to the negative input end of the amplifier, and another end of the fourth switch being connected to the output end of the amplifier, where the scanning cycle of the sequence signal of the fourth switch is N times of the scanning cycle of the sequence signal of the second switch, and N is a positive integer greater than or equal to 2; a feedback element, an end of the feedback element being connected to the negative input end of the amplifier, and another end of the feedback element being connected to the output end of the amplifier; and, a fifth switch, an end of the fifth switch being connected to the output end of the amplifier, and another end of the fifth switch being used as the output end of the fingerprint recognition circuit; where, in the first scanning cycle corresponding to the sequence signal of the second switch, the second switch and the fourth switch are firstly turned on and then turned off to reset the fingerprint recognition circuit; in the first working state, the fifth switch is set to normally on; in the remaining N−1 scanning cycles corresponding to the sequence signal of the second switch, the fourth switch is set to normally off; in the second working state, the fourth switch and the fifth switch are set to normally off.

In an embodiment, the fingerprint recognition unit includes: a fingerprint detection capacitor, an end of the fingerprint detection capacitor being coupled to a finger, and another end of the fingerprint detection capacitor being coupled to the sensing electrode; and a parasitic capacitor, an end of the parasitic capacitor being coupled to the sensing electrode, another end of the parasitic capacitor being connected to the second reference voltage. The second reference voltage is an internal reference voltage, and the second reference voltage is smaller than the first reference voltage.

In the embodiment of the present disclosure, the fingerprint recognition circuit is used for detecting fingerprint recognition units arranged in an array. A fingerprint identification unit is connected to a fingerprint identification circuit. The fingerprint identification circuit includes a loop selection unit and a signal processing unit. The loop selection unit is used for selectively loading the first driving voltage or the second driving voltage to the sensing electrode of the fingerprint recognition unit, and is further used for selectively coupling the sensing electrode to the first input end of the signal processing unit. The second input end of the signal processing unit is connected to the second reference signal of a fixed level, and the output end is used as the output end of the fingerprint recognition circuit. The signal processing unit is used for processing the electrical signal input at the first input end and outputting the processed detection signal, so as to perform fingerprint recognition based on the processed detection signal. The fingerprint identification circuit is configured with a rest state. In the reset state, the loop selection unit loads the first driving voltage to the sensing electrode. The loop selection unit is controlled through the sequence signal to enable the fingerprint recognition units to be in different working states. The circuit structure is simple, and the accuracy of fingerprint recognition can be improved by resetting the fingerprint recognition circuit.

According to embodiments of the present disclosure, there is further provided a chip including the above fingerprint recognition circuit. This chip can improve the accuracy of fingerprint recognition based on the above fingerprint recognition circuit.

For the chip embodiment, since it includes a fingerprint identification circuit, the description is relatively simple. For relevant details, reference can be made to the partial description of the fingerprint identification circuit embodiment.

The present disclosure provides a fingerprint identification circuit, a method for controlling a fingerprint identification circuit, and a chip, which at least overcomes the problems of low detection accuracy and complex circuits of the fingerprint identification circuit provided in related art to a certain extent.

Additional features and advantages of the present disclosure will be apparent from the following detailed description, or, may be partially learned by practice of the present disclosure.

According to an aspect of the present disclosure, there is provided a method for controlling a fingerprint recognition circuit, which is used for detecting fingerprint recognition units arranged in an array. A fingerprint recognition unit is connected to a fingerprint recognition circuit. The fingerprint recognition circuit includes a loop selection unit and a signal processing unit; the loop selection unit is used for selectively loading a first driving voltage or a second driving voltage to a sensing electrode of the fingerprint recognition unit, where the first driving voltage is greater than the second driving voltage; the loop selection unit is further used for selectively coupling the sensing electrode to a first input end of the signal processing unit; a second input end of the signal processing unit is connected to a first reference voltage of a fixed level, and an output end of the signal processing unit is used as an output end of the fingerprint identification circuit for processing an electrical signal input to the first input end and outputting a processed detection signal; where the control method includes: resetting the fingerprint identification circuit into a reset state, where the loop selection unit loads the first driving voltage to the sensing electrode; and, controlling a state of the loop selection unit through a sequence signal, where the fingerprint recognition units arranged in an array is configured in different working states according to the state of the loop selection unit.

In an embodiment of the present disclosure, for adjacent fingerprint identification units in different working states, a difference between a voltage value of the second driving voltage and a voltage value of the first reference voltage is within a preset range.

In an embodiment of the present disclosure, the voltage value of the second driving voltage is equal to the voltage value of the first reference voltage.

In an embodiment of the present disclosure, the first driving voltage and the second driving voltage are internal driving voltages, and the first reference voltage is an internal reference voltage.

In an embodiment of the present disclosure, the loop selection unit is controlled through the sequence signal, and the fingerprint identification circuit is configured with two working states that includes a first working state and a second working state; in the first working state, the loop selection unit alternately connects the first driving voltage and the first input end of the signal processing unit to the sensing electrode to enable the signal processing unit to output the detection signal; in the second working state, the loop selection unit alternately loads the first driving voltage and the second driving voltage to the sensing electrode.

In an embodiment of the present disclosure, the loop selection unit includes: a first switch, used for coupling the sensing electrode to the first input end of the signal processing unit; a second switch, used for loading the first driving voltage to the sensing electrode; and a third switch, used for loading the second driving voltage to the sensing electrode; where, resetting the fingerprint recognition circuit includes: controlling the second switch of each fingerprint recognition circuit to be on, and controlling the first switch and the third switch to be off; controlling the state of the loop selection unit through the sequence signal, where the fingerprint recognition units arranged in an array is configured in different working states according to the state of the loop selection unit, includes: in the first working state, setting the third switch to normally off, the second switch to firstly off and then on, and the first switch to firstly on and then off; and in the second working state, setting the first switch to be normally off, the third switch to firstly on and then off, and the second switch to firstly off and then on.

In an embodiment of the present disclosure, the signal processing unit includes: an amplifier, a positive input end of the amplifier being connected to the first reference voltage, and a negative input end of the amplifier being coupled to the sensing electrode through the first switch; a fourth switch, an end of the fourth switch being coupled to the negative input end of the amplifier, and another end of the fourth switch being connected to an output end of the amplifier; a feedback element, an end of the feedback element being connected to the negative input end of the amplifier, and another end of the feedback element being connected to the output end of the amplifier; and a fifth switch, an end of the fifth switch being connected to the output end of the amplifier, and another end being used as the output end of the fingerprint identification circuit; where, a sequence signal of the fourth switch is the same as a sequence signal of the second switch; in the first working state, the fifth switch is set to normally on; and in the second working state, the fifth switch is set to normally off.

In an embodiment of the present disclosure, the loop selection unit includes: a first switch, used for coupling the sensing electrode to the first input end of the signal processing unit; a second switch, used for loading the first driving voltage to the sensing electrode; and a third switch, used for loading the second driving voltage to the sensing electrode; where in the first working state, the third switch is set to normally off, the second switch is firstly turned on and then turned off, and the first switch is firstly turned off and then turned on; and in the second working state, the first switch is set to normally off, the third switch is firstly turned off and then turned on, and the second switch is firstly turned on and then turned off.

In an embodiment of the present disclosure, the signal processing unit includes: an amplifier, a positive input end of the amplifier being connected to the first reference voltage, and a negative input end of the amplifier being coupled to the sensing electrode through the first switch; a fourth switch, an end of the fourth switch being coupled to the negative input end of the amplifier, and another end of the fourth switch being connected to an output end of the amplifier; where a scanning cycle of a sequence signal of the fourth switch is N times of a scanning cycle of a sequence signal of the second switch, and N is a positive integer greater than or equal to 2; a feedback element, an end of the feedback element being connected to the negative input end of the amplifier, and another end of the feedback element being connected to the output end of the amplifier; and a fifth switch, an end of the fifth switch being connected to the output end of the amplifier, and another end of the fifth switch being used as the output end of the fingerprint identification circuit; where, in a first scanning cycle corresponding to the sequence signal of the second switch, the second switch and the fourth switch are firstly turned on and then turned off to reset the fingerprint recognition circuit; in the first working state, the fifth switch is set to normally on, and in remaining N−1 scanning cycles corresponding to the sequence signal of the second switch, the fourth switch is set to normally off; and in the second working state, the fourth switch and the fifth switch are set to normally off.

According to another aspect of the present disclosure, there is further provided a fingerprint recognition circuit used for detecting fingerprint recognition units arranged in an array. A fingerprint recognition unit is connected to a fingerprint recognition circuit, where the fingerprint recognition circuit includes a loop selection unit and a signal processing unit; the loop selection unit is used for selectively loading a first driving voltage or a second driving voltage to a sensing electrode of a corresponding fingerprint identification unit, where the first driving voltage is greater than the second driving voltage; and the loop selection unit is further used for selectively coupling the sensing electrode to a first input end of the signal processing unit; a second input end of the signal processing unit is connected to a first reference signal of a fixed level, and an output end of the signal processing unit is used as an output end of the fingerprint identification circuit for processing an electrical signal input to the first input end and outputting a processed detection signal; where the fingerprint identification circuit is configured with a reset state; and in the reset state, the loop selection unit loads the first driving voltage to the sensing electrode; and, the loop selection unit is controlled through a sequence signal, and the fingerprint identification circuit is configured in different working states according to a state of the loop selection unit.

In an embodiment of the present disclosure, for adjacent fingerprint identification units in different working states, a difference between a voltage value of the second driving voltage and a voltage value of the first reference voltage is within a preset range.

In an embodiment of the present disclosure, the voltage value of the second driving voltage is equal to the voltage value of the first reference voltage.

In an embodiment of the present disclosure, the first driving voltage and the second driving voltage are internal driving voltages, and the first reference voltage is an internal reference voltage.

In an embodiment of the present disclosure, the fingerprint identification circuit is configured with two working states that includes a first working state and a second working state; in the first working state, the loop selection unit alternately connects the first driving voltage and the first input end of the signal processing unit to the sensing electrode to enable the signal processing unit to output the detection signal; and in the second working state, the loop selection unit alternately loads the first driving voltage and the second driving voltage to the sensing electrode.

In an embodiment of the present disclosure, the loop selection unit includes: a first switch, used for coupling the sensing electrode to the first input end of the signal processing unit; a second switch, used for loading the first driving voltage to the sensing electrode; and a third switch, used for loading the second driving voltage to the sensing electrode; where, in the reset state, the second switch of each fingerprint recognition circuit is turned on, and the first switch and the third switch are turned off; in the first working state, the third switch is set to normally off, the second switch is firstly turned off and then turned on, and the first switch is firstly turned on and then turned off; and in the second working state, the first switch is set to normally off, the third switch is firstly turned on and then turned off, and the second switch is firstly turned off and then turned on.

In an embodiment of the present disclosure, the signal processing unit includes: an amplifier, a positive input end of the amplifier being connected to the first reference voltage, and a negative input end of the amplifier being coupled to the sensing electrode through the first switch; a fourth switch, an end of the fourth switch being coupled to the negative input end of the amplifier, and another end of the fourth switch being connected to an output end of the amplifier; a feedback element, an end of the feedback element being connected to the negative input end of the amplifier, and another end of the feedback element being connected to the output end of the amplifier; and a fifth switch, an end the fifth switch being connected to the output end of the amplifier, and another end the fifth switch being used as the output end of the fingerprint identification circuit; where, a sequence signal of the fourth switch is the same as a sequence signal of the second switch; in the first working state, the fifth switch is set to normally on; and in the second working state, the fifth switch is set to normally off.

In an embodiment of the present disclosure, the loop selection unit includes: a first switch, used for coupling the sensing electrode to the first input end of the signal processing unit; a second switch, used for loading the first driving voltage to the sensing electrode; and a third switch, used for loading the second driving voltage to the sensing electrode; where, in the first working state, the third switch is set to normally off, the second switch is firstly turned on and then turned off, and the first switch is firstly turned off and then turned on; and in the second working state, the first switch is set to normally off, the third switch is firstly turned off and then turned on, and the second switch is firstly turned on and then turned off.

In an embodiment of the present disclosure, the signal processing unit includes: an amplifier, a positive input end of the amplifier being connected to the first reference voltage, and a negative input end of the amplifier being coupled to the sensing electrode through the first switch; a fourth switch, an end the fourth switch being coupled to the negative input end of the amplifier and another end the fourth switch being connected to the output end of the amplifier; where a scanning cycle of a sequence signal of the fourth switch is N times of a scanning cycle of a sequence signal of the second switch, and N is a positive integer greater than or equal to 2; a feedback element, an end of the feedback element being connected to the negative input end of the amplifier, and another end of the feedback element being connected to the output end of the amplifier; and a fifth switch, an end the fifth switch being connected to the output end of the amplifier, and another end the fifth switch being used as the output end of the fingerprint identification circuit; where, in a first scanning cycle corresponding to the sequence signal of the second switch, the second switch and the fourth switch are firstly turned on and then turned off to reset the fingerprint recognition circuit; in the first working state, the fifth switch is set to normally on, and in remaining N−1 scanning cycles corresponding to the sequence signal of the second switch, the fourth switch is set to normally off; and in the second working state, the fourth switch and the fifth switch are set to normally off.

In an embodiment of the present disclosure, the fingerprint identification unit includes: a fingerprint detection capacitor, an end of the fingerprint detection capacitor being coupled to a finger, and another end of the fingerprint detection capacitor being coupled to the sensing electrode; and a parasitic capacitance, an end of the parasitic capacitance being coupled to the sensing electrode, and another end of the parasitic capacitance being connected to a second reference voltage; where the second reference voltage is an internal reference voltage, and the second reference voltage is smaller than the first reference voltage.

According to another aspect of the present disclosure, there is provided a chip including the fingerprint identification circuit as described above.

The present disclosure provides a fingerprint identification circuit, a method for controlling a fingerprint recognition circuit, and a chip, which are used for detecting fingerprint identification units arranged in an array. A fingerprint identification unit is connected to a fingerprint identification circuit. The fingerprint identification circuit includes a loop selection unit and a signal processing unit. The loop selection unit is used for selectively loading the first driving voltage or the second driving voltage to the sensing electrode of the fingerprint recognition unit, and is further used for selectively coupling the sensing electrode to the first input end of the signal processing unit. The second input end of the signal processing unit is connected to the second reference signal of a fixed level, and the output end is used as the output end of the fingerprint recognition circuit. The signal processing unit is used for processing the electrical signal input at the first input end and outputting the processed detection signal, so as to perform fingerprint recognition based on the processed detection signal. The control method includes resetting the fingerprint recognition circuit, to enable the loop selection unit to load the first driving voltage to the sensing electrode, and controlling the state of the loop selection unit through the sequence signal to enable the fingerprint recognition units arranged in an array to be in different working states. The circuit structure is simple, and the accuracy of fingerprint recognition can be improved by resetting the fingerprint recognition circuit.

The various embodiments in the present specification are described in a progressive manner. Description of each embodiment focuses on its differences from other embodiments. The same and similar parts between the various embodiments can be referred to each other.

Although preferred embodiments of the embodiments of the present disclosure have been described, those skilled in the art can make additional changes and modifications to these embodiments once they know the basic inventive concepts. Therefore, it is intended that the appended claims are construed to include the preferred embodiments and all changes and modifications that fall within the scope of embodiments of the present disclosure.

Finally, it should be noted that, in the context, relational terms such as first and second are only used to distinguish an entity or operation from another entity or operation, and do not necessarily require or imply that there is any such actual relationship or sequence between these entities or operations. Furthermore, the terms "comprise", "include" or any other variation of them are intended to cover a non-exclusive inclusion such that a process, method, article, or terminal device that includes a list of elements includes not only those elements, but also elements not clearly listed or other elements inherent to such process, method, article or terminal device. In the condition with no further limitation, an element defined by the statement "includes a . . . " does not exclude the presence of additional identical elements in a process, method, article or terminal device that includes the stated element.

The fingerprint identification circuit, the method for controlling the fingerprint identification circuit, and the chip provided by the present disclosure have been introduced in detail above. Specific examples are used in the context to illustrate the principles and implementation methods of the present disclosure. The description of the above embodiments is only used to assist in understanding the method of the present disclosure and its core concept. At the same time, for those of ordinary skill in the art, there will be changes in the specific implementation and application scope based on the concept of the present disclosure. In summary, the content of the specification should not be understood as a limitation on the present disclosure.

Other embodiments of the present disclosure will be readily apparent to those skilled in the art from consideration of the specification and practice of the present disclosure. The present disclosure is intended to cover any variations, uses, or adaptations of the present disclosure that follow the general principles of the present disclosure and include common knowledge or conventional technical means in the art that are not disclosed in the present disclosure. It is intended that the specification and examples are considered as exemplary only, with a true scope and spirit of the present disclosure being indicated by the following claims.

What is claimed is:

1. A method for controlling a fingerprint recognition circuit, used for detecting fingerprint recognition units arranged in an array; wherein a fingerprint recognition unit is connected to a fingerprint recognition circuit, the fingerprint recognition circuit comprises a loop selection unit and a signal processing unit; the loop selection unit is used for selectively loading a first driving voltage or a second driving voltage to a sensing electrode of the fingerprint recognition unit, wherein the first driving voltage is greater than the second driving voltage; the loop selection unit is further used for selectively coupling the sensing electrode to a first input end of the signal processing unit; a second input end of the signal processing unit is connected to a first reference voltage of a fixed level, and an output end of the signal processing unit is used as an output end of the fingerprint identification circuit for processing an electrical signal input at the first input end and outputting a processed detection signal; wherein the method comprises:
resetting the fingerprint identification circuit into a reset state, wherein the loop selection unit loads the first driving voltage to the sensing electrode in the reset state; and
controlling a state of the loop selection unit through a sequence signal, wherein the fingerprint recognition units arranged in an array is configured in different working states according to the state of the loop selection unit.

2. The method for controlling the fingerprint identification circuit according to claim 1, wherein, for adjacent fingerprint identification units in different working states, a difference between a voltage value of the second driving voltage and a voltage value of the first reference voltage is within a preset range.

3. The method for controlling the fingerprint recognition circuit according to claim 2, wherein the voltage value of the second driving voltage is equal to the voltage value of the first reference voltage.

4. The method for controlling the fingerprint recognition circuit according to claim 1, wherein the first driving voltage and the second driving voltage are internal driving voltages, and the first reference voltage is an internal reference voltage.

5. The method for controlling the fingerprint identification circuit according to claim 1, wherein the loop selection unit is controlled through the sequence signal, and the fingerprint identification circuit is configured with two working states that comprises a first working state and a second working state;
in the first working state, the loop selection unit alternately connects the first driving voltage and the first input end of the signal processing unit to the sensing electrode to enable the signal processing unit to output the detection signal;
in the second working state, the loop selection unit alternately loads the first driving voltage and the second driving voltage to the sensing electrode.

6. The method for controlling the fingerprint identification circuit according to claim 5, wherein the loop selection unit comprises:
a first switch, used for coupling the sensing electrode to the first input end of the signal processing unit;
a second switch, used for loading the first driving voltage to the sensing electrode; and
a third switch, used for loading the second driving voltage to the sensing electrode;
wherein, resetting the fingerprint recognition circuit comprises: controlling the second switch to be on, and controlling the first switch and the third switch to be off; and
controlling the state of the loop selection unit through the sequence signal, wherein the fingerprint recognition units arranged in an array is configured in different working states according to the state of the loop selection unit, comprises:
in the first working state, setting the third switch to normally off, the second switch to firstly off and then on, and the first switch to firstly on and then off; and
in the second working state, setting the first switch to be normally off, the third switch to firstly on and then off, and the second switch to firstly off and then on.

7. The method for controlling the fingerprint identification circuit according to claim 6, wherein the signal processing unit comprises:
an amplifier, a positive input end of the amplifier being connected to the first reference voltage, and a negative input end of the amplifier being coupled to the sensing electrode through the first switch;
a fourth switch, an end of the fourth switch being coupled to the negative input end of the amplifier, and another end of the fourth switch being connected to an output end of the amplifier;
a feedback element, an end of the feedback element being connected to the negative input end of the amplifier, and another end of the feedback element being connected to the output end of the amplifier; and
a fifth switch, an end of the fifth switch being connected to the output end of the amplifier, and another end being used as the output end of the fingerprint identification circuit;
wherein, a sequence signal of the fourth switch is the same as a sequence signal of the second switch;
in the first working state, the fifth switch is set to normally on; and in the second working state, the fifth switch is set to normally off.

8. The method for controlling the fingerprint identification circuit according to claim 5, wherein the loop selection unit comprises:
a first switch, used for coupling the sensing electrode to the first input end of the signal processing unit;
a second switch, used for loading the first driving voltage to the sensing electrode; and
a third switch, used for loading the second driving voltage to the sensing electrode;
wherein in the first working state, the third switch is set to normally off, the second switch is firstly turned on and then turned off, and the first switch is firstly turned off and then turned on; and
in the second working state, the first switch is set to normally off, the third switch is firstly turned off and then turned on, and the second switch is firstly turned on and then turned off.

9. The method for controlling the fingerprint recognition circuit according to claim 8, wherein the signal processing unit comprises:
an amplifier, a positive input end of the amplifier being connected to the first reference voltage, and a negative input end of the amplifier being coupled to the sensing electrode through the first switch;
a fourth switch, an end of the fourth switch being coupled to the negative input end of the amplifier, and another end of the fourth switch being connected to an output end of the amplifier; wherein a scanning cycle of a sequence signal of the fourth switch is N times of a scanning cycle of a sequence signal of the second switch, and N is a positive integer greater than or equal to 2;
a feedback element, an end of the feedback element being connected to the negative input end of the amplifier, and another end of the feedback element being connected to the output end of the amplifier; and
a fifth switch, an end of the fifth switch being connected to the output end of the amplifier, and another end of the fifth switch being used as the output end of the fingerprint identification circuit;
wherein, in a first scanning cycle corresponding to the sequence signal of the second switch, the second switch and the fourth switch are firstly turned on and then turned off to reset the fingerprint recognition circuit;
in the first working state, the fifth switch is set to normally on, and in remaining N−1 scanning cycles corresponding to the sequence signal of the second switch, the fourth switch is set to normally off; and
in the second working state, the fourth switch and the fifth switch are set to normally off.

10. A fingerprint recognition circuit, used for detecting fingerprint recognition units arranged in an array, and a fingerprint recognition unit being connected to a fingerprint recognition circuit, wherein the fingerprint recognition circuit comprises:
a loop selection unit, used for selectively loading a first driving voltage or a second driving voltage to a sensing electrode of a corresponding fingerprint recognition unit; wherein the first driving voltage is greater than the second driving voltage; and
a signal processing unit, a second input end of the signal processing unit being connected to a first reference signal of a fixed level, and an output end of the signal processing unit being used as an output end of the fingerprint identification circuit for processing an electrical signal input at a first input end of the signal processing unit and outputting a processed detection signal;
wherein, the loop selection unit is further used for selectively coupling the sensing electrode to the first input end of the signal processing unit; the fingerprint identification circuit is configured with a reset state; in the reset state, the loop selection unit loads the first driving voltage to the sensing electrode; the loop selection unit is controlled through a sequence signal, and the fingerprint identification circuit is configured in different working states according to a state of the loop selection unit.

11. The fingerprint identification circuit according to claim 10, wherein, for adjacent fingerprint identification units in different working states, a difference between a voltage value of the second driving voltage and a voltage value of the first reference voltage is within a preset range.

12. The fingerprint recognition circuit according to claim 11, wherein the voltage value of the second driving voltage is equal to the voltage value of the first reference voltage.

13. The fingerprint recognition circuit according to claim 10, wherein the first driving voltage and the second driving voltage are internal driving voltages, and the first reference voltage is an internal reference voltage.

14. The fingerprint recognition circuit according to claim 10, wherein the fingerprint identification circuit is configured with two working states that comprises a first working state and a second working state;
in the first working state, the loop selection unit alternately connects the first driving voltage and the first input end of the signal processing unit to the sensing electrode to enable the signal processing unit to output the detection signal; and
in the second working state, the loop selection unit alternately loads the first driving voltage and the second driving voltage to the sensing electrode.

15. The fingerprint identification circuit according to claim 14, wherein the loop selection unit comprises:
a first switch, used for coupling the sensing electrode to the first input end of the signal processing unit;
a second switch, used for loading the first driving voltage to the sensing electrode; and
a third switch, used for loading the second driving voltage to the sensing electrode;
wherein, in the reset state, the second switch is turned on, and the first switch and the third switch are turned off;
in the first working state, the third switch is set to normally off, the second switch is firstly turned off and then turned on, and the first switch is firstly turned on and then turned off; and
in the second working state, the first switch is set to normally off, the third switch is firstly turned on and then turned off, and the second switch is firstly turned off and then turned on.

16. The fingerprint identification circuit according to claim 15, wherein the signal processing unit comprises:
an amplifier, a positive input end of the amplifier being connected to the first reference voltage, and a negative input end of the amplifier being coupled to the sensing electrode through the first switch;
a fourth switch, an end of the fourth switch being coupled to the negative input end of the amplifier, and another end of the fourth switch being connected to an output end of the amplifier;
a feedback element, an end of the feedback element being connected to the negative input end of the amplifier, and another end of the feedback element being connected to the output end of the amplifier; and a fifth switch, an end the fifth switch being connected to the output end of the amplifier, and another end the fifth switch being used as the output end of the fingerprint identification circuit;

wherein, a sequence signal of the fourth switch is the same as a sequence signal of the second switch;

in the first working state, the fifth switch is set to normally on; and in the second working state, the fifth switch is set to normally off.

17. The fingerprint identification circuit according to claim 14, wherein the loop selection unit comprises:

a first switch, used for coupling the sensing electrode to the first input end of the signal processing unit;

a second switch, used for loading the first driving voltage to the sensing electrode; and a third switch, used for loading the second driving voltage to the sensing electrode;

wherein, in the first working state, the third switch is set to normally off, the second switch is firstly turned on and then turned off, and the first switch is firstly turned off and then turned on; and in the second working state, the first switch is set to normally off, the third switch is firstly turned off and then turned on, and the second switch is firstly turned on and then turned off.

18. The fingerprint identification circuit according to claim 17, wherein the signal processing unit comprises:

an amplifier, a positive input end of the amplifier being connected to the first reference voltage, and a negative input end of the amplifier being coupled to the sensing electrode through the first switch;

a fourth switch, an end the fourth switch being coupled to the negative input end of the amplifier and another end the fourth switch being connected to the output end of the amplifier; wherein a scanning cycle of a sequence signal of the fourth switch is N times of a scanning cycle of a sequence signal of the second switch, and N is a positive integer greater than or equal to 2;

a feedback element, an end of the feedback element being connected to the negative input end of the amplifier, and another end of the feedback element being connected to the output end of the amplifier; and a fifth switch, an end the fifth switch being connected to the output end of the amplifier, and another end the fifth switch being used as the output end of the fingerprint identification circuit;

wherein, in a first scanning cycle corresponding to the sequence signal of the second switch, the second switch and the fourth switch are firstly turned on and then turned off to reset the fingerprint recognition circuit;

in the first working state, the fifth switch is set to normally on, and in remaining N−1 scanning cycles corresponding to the sequence signal of the second switch, the fourth switch is set to normally off; and in the second working state, the fourth switch and the fifth switch are set to normally off.

19. The fingerprint identification circuit according to claim 10, wherein the fingerprint identification unit comprises:

a fingerprint detection capacitor, an end of the fingerprint detection capacitor being coupled to a finger, and another end of the fingerprint detection capacitor being coupled to the sensing electrode; and a parasitic capacitance, an end of the parasitic capacitance being coupled to the sensing electrode, and another end of the parasitic capacitance being connected to a second reference voltage; wherein the second reference voltage is an internal reference voltage, and the second reference voltage is smaller than the first reference voltage.

20. A chip, comprising a fingerprint recognition circuit, used for detecting fingerprint recognition units arranged in an array, and a fingerprint recognition unit being connected to a fingerprint recognition circuit, wherein the fingerprint recognition circuit comprises:

a loop selection unit, used for selectively loading a first driving voltage or a second driving voltage to a sensing electrode of a corresponding fingerprint recognition unit; wherein the first driving voltage is greater than the second driving voltage; and a signal processing unit, a second input end of the signal processing unit being connected to a first reference signal of a fixed level, and an output end of the signal processing unit being used as an output end of the fingerprint identification circuit for processing an electrical signal input at a first input end of the signal processing unit and outputting a processed detection signal;

wherein, the loop selection unit is further used for selectively coupling the sensing electrode to the first input end of the signal processing unit; the fingerprint identification circuit is configured with a reset state; in the reset state, the loop selection unit loads the first driving voltage to the sensing electrode; the loop selection unit is controlled through a sequence signal, and the fingerprint identification circuit s configured in different working states according to a state of the loop selection unit.

* * * * *